(12) United States Patent
Tanaka et al.

(10) Patent No.: US 9,359,511 B2
(45) Date of Patent: Jun. 7, 2016

(54) COATING SOLUTION FOR PRODUCING OPTICAL FILM, METHOD FOR PRODUCING THE COATING SOLUTION, METHOD FOR MANUFACTURING OPTICAL COMPONENT, AND IMAGING OPTICAL SYSTEM

(75) Inventors: Hiroyuki Tanaka, Kawasaki (JP); Motokazu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 13/876,443

(22) PCT Filed: Sep. 16, 2011

(86) PCT No.: PCT/JP2011/071778
§ 371 (c)(1),
(2), (4) Date: Mar. 27, 2013

(87) PCT Pub. No.: WO2012/043425
PCT Pub. Date: Apr. 5, 2012

(65) Prior Publication Data
US 2013/0194672 A1    Aug. 1, 2013

(30) Foreign Application Priority Data
Sep. 30, 2010   (JP) ................................. 2010-220571

(51) Int. Cl.
*G02B 27/00*    (2006.01)
*C09D 7/12*     (2006.01)
*C03C 17/25*    (2006.01)
*G02B 1/113*    (2015.01)
*G02B 1/11*     (2015.01)

(52) U.S. Cl.
CPC .............. *C09D 7/1233* (2013.01); *C03C 17/25* (2013.01); *G02B 1/11* (2013.01); *G02B 1/113* (2013.01); *C03C 2217/228* (2013.01); *C03C 2218/11* (2013.01)

(58) Field of Classification Search
CPC ............ C08K 5/101; C08K 3/36; C08K 5/06; C08K 5/103; C08K 3/22; C08K 3/34; C08K 5/00; C08K 5/005; C08K 5/07; C08K 5/12; C08K 5/1535; C08K 5/1545; C08K 9/04; C08K 9/06; C08K 2003/2206; C08K 2003/2237; C08K 2003/2296; C09D 7/1233; C09D 5/00; C09D 1/00; C09D 4/00; C09D 11/00; C09D 7/1216; C09D 7/1291; C09D 11/03; C09D 11/322; C09D 11/54; C09D 5/14; C09D 5/1625; C09D 5/29; C09D 5/36; C09D 7/001; C09D 7/002; C09D 7/1225; C09D 7/1266
USPC ............. 359/601, 488.01, 229, 290, 580, 581
See application file for complete search history.

(56) References Cited

U.S. PATENT DOCUMENTS

| | | | | |
|---|---|---|---|---|
| 5,051,278 | A  * | 9/1991 | Paz-Pujalt ..................... | 427/108 |
| 5,165,960 | A  * | 11/1992 | Platts ............................ | 427/166 |
| 2009/0091679 | A1* | 4/2009 | Park et al. ...................... | 349/48 |

FOREIGN PATENT DOCUMENTS

| | | |
|---|---|---|
| EP | 125721 A1 | 11/1984 |
| EP | 2113493 A1 | 11/2009 |
| JP | 11-157832 A | 6/1999 |
| JP | 2008-501557 A | 1/2008 |
| JP | 2008-233880 A | 10/2008 |

OTHER PUBLICATIONS

M. Tada et al., "Sol-gel porcessing and characterization of alkaline earth and rare-earth fluoride thin films", J. Mater. Res Society, vol. 14, No. 4, Apr. 1999, 1610-1616.

* cited by examiner

*Primary Examiner* — James Greece
*Assistant Examiner* — Sharrief Broome
(74) *Attorney, Agent, or Firm* — Canon U.S.A., Inc., IP Division

(57) ABSTRACT

The present invention provides a coating solution for producing an optical film and a method for producing the coating solution which has improved temporal stability and which is capable of preventing the occurrence of defects in a coating film when a magnesium fluoride film is formed by applying a coating solution containing magnesium fluorocarboxylate and then firing the coating solution.

A coating solution for producing an optical film includes at least a magnesium compound represented by (CF3-X—COO)2Mg (wherein X represents a single bond or —CH2- which may be substituted by a fluorine atom), and a compound represented by general formula (1). A method for producing the coating solution is also provided.

6 Claims, 1 Drawing Sheet

COATING SOLUTION FOR PRODUCING OPTICAL FILM, METHOD FOR PRODUCING THE COATING SOLUTION, METHOD FOR MANUFACTURING OPTICAL COMPONENT, AND IMAGING OPTICAL SYSTEM

TECHNICAL FIELD

The present invention relates to a coating solution for producing an optical film, a method for producing the coating solution, a method for manufacturing an optical component having an excellent antireflection effect, and an imaging optical system.

BACKGROUND ART

For the purpose of improving light transmittance, an antireflection film is provided on a surface of an optical component constituting an optical device.

Reflectance becomes theoretically zero by coating with a low-refractive-index material to an optical thickness of $\lambda/4$ based to wavelength $\lambda$, the low-refractive-index material having a refractive index (nc) represented by the following relational expression to refractive index ng of a substrate in air:

$$nc=\sqrt{ng} \quad \text{(Expression 1)}$$

As an antireflection film for an optical element which requires a lower-reflection effect, instead of the above-described single layer, a multilayer film is used, in which a high-refractive-index film and a low-refractive-index film are alternately laminated. In this case, a low-refractive-index material is important for the uppermost layer on the air side. On the other hand, low-refractive-index films are widely attempted to be made porous in order to decrease the refractive indexes.

As a method for forming porous films, a wet process, not a dry process such as vacuum deposition, is effective. The wet process has the advantage of easy formation of the porous films because the films are formed by a coating method after coating materials are dissolved or dispersed in solvents.

PTL 1 and NPL 1 each disclose a method for forming magnesium fluoride by thermal disproportional reaction. That is, PTL 1 and NPL 1 each disclose a method for forming magnesium fluoride by applying a fluorine-containing magnesium compound or a magnesium fluorocarboxylate compound used as a precursor to a substrate and then performing thermal disproportional reaction.

Such compounds and fluorocarboxylic acids generally have high hygroscopicity and thus produce defects in coating films due to wetting when coating solutions containing a mixture of a magnesium compound and a trifluoroacetic acid are applied, thereby causing the problem that uniform coating films cannot be obtained.

PTL 2 or PTL 3 discloses a method for stably forming a coating solution by adding a stabilizer to a magnesium compound. However, this literature does not describe a countermeasure against the occurrence of film defects when a coating solution is applied.

CITATION LIST

Patent Literature

PTL 1 PCT Japanese Translation Patent Publication No. 2008-501557
PTL 2 Japanese Patent Laid-Open No. 2008-233880
PTL 3 Japanese Patent Laid-Open No. 11-157832

Non Patent Literature

NPL 1 M. Tada et al., J. Mater, Res, Vol. 14, No. 4, April 1999, 1610-1616

It is known that magnesium has six-coordination at a maximum. On the other hand, magnesium is a bivalent metal. In the case of magnesium acetate as an example of magnesium compounds, magnesium acetate tetrahydrate ($Mg(CH_3COO)_2 \cdot 4H_2O$) contains 4 water molecules as crystal water. Other magnesium compounds, such as acetylacetone magnesium(II) dihydroate ($Mg(C_5H_7O_2)_2 \cdot 2H_2O$), contain crystal water. These compounds exhibit deliquescency.

Similarly, the magnesium fluorocarboxylate compound as a precursor for forming magnesium fluoride by thermal disproportional reaction contains crystal water.

In the process for forming magnesium fluorocarboxylate, magnesium fluorocarboxylate free from crystal water can be formed from a raw material free from crystal water or by direct reaction of metallic magnesium with a fluorocarboxylic acid.

However, even in this case, a coating film absorbs atmospheric water during the process of applying magnesium fluorocarboxylate to form a film, thereby producing pinhole-like defects in the coating film.

The number of defects in the coating film due to deliquescency increases with the passage of time after application of magnesium fluorocarboxylate. Therefore, the number of defects in the film can be decreased by shortening the process ranging from application to firing, but satisfied results have not yet been obtained.

SUMMARY OF INVENTION

Technical Problem

The present invention provides a coating solution for producing an optical film and a method for producing the coating solution which has improved temporal stability and which is capable of preventing the occurrence of defects in a coating film when a magnesium fluoride film is formed by applying the coating solution containing magnesium fluorocarboxylate and then firing the coating solution.

The present invention also provides a method for manufacturing an optical component using the coating solution for producing an optical film.

Solution to Problem

In order to solve the problem, a coating solution for producing an optical film includes at least a magnesium compound represented by $(CF_3-X-COO)_2Mg$ (wherein X represents a single bond or $-CH_2-$ which may be substituted by a fluorine atom) and a compound represented by the following general formula (1):

[Chem. 1]

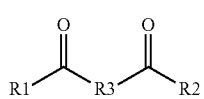

General Formula (1)

wherein R1 and R2 each represent a hydrogen atom, an alkyl group, or an alkoxy group, and R3 represents $-O-$ or $-CH_2-$.

In order to solve the problem, a method for producing a coating solution for producing an optical film includes a step of mixing at least a magnesium compound represented by $(CF_3—X—COO)_2Mg$ (wherein X represents a single bond or $—CH_2—$ which may be substituted by a fluorine atom) and a compound represented by the general formula (1) and then adjusting the concentration of the resultant mixture with a solvent.

In order to solve the problem, a method for manufacturing an optical component includes a step of applying the coating solution for producing an optical film to a substrate and a step of heating the substrate to which the coating solution for producing an optical film has been applied.

In order to solve the problem, an imaging optical system includes an optical component manufactured by the method for manufacturing an optical component, wherein light from an object is condensed by the optical component to form an object image.

According to the present invention, it is possible to provide a coating solution for producing an optical film and a method for producing the coating solution which has improved temporal stability and which is capable of preventing the occurrence of film defects in a coating film when a magnesium fluoride film is produced by applying the coating solution containing magnesium fluorocarboxylate and then firing the coating solution.

According to the present invention, it is possible to provide a method for manufacturing an optical component using the coating solution for producing an optical film and provide an imaging optical system.

Further features of the present invention will become apparent from the following description of exemplary embodiments with reference to the attached drawings.

DESCRIPTION OF EMBODIMENTS

Figure 1A:
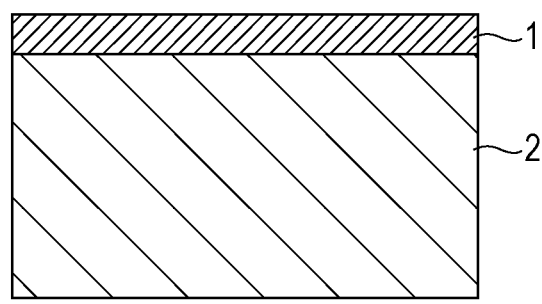
FIG. 1A is a drawing showing an example of an optical component according to the present invention.

Embodiments of the present invention are described in detail below.

A coating solution for producing an optical film according to the present invention includes at least a magnesium compound represented by $(CF_2—X—COO)_2Mg$ (wherein X represents a single bond or $—CH_2—$ which may be substituted by a fluorine atom) and a compound represented by the following general formula (1):

[Chem. 2]

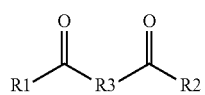

General Formula (1)

wherein R1 and R2 each represent a hydrogen atom, an alkyl group, or an alkoxy group, and R3 represents $—O—$ or $—CH_2—$.

The inventors of the present invention have found that in wet coating of magnesium fluorocarboxylate, the occurrence of defects in a coating film due to moisture absorption can be prevented by using a compound represented by the general formula (1) as a stabilizer.

Magnesium can take six-coordination at a maximum. Although oxygen is considered as an atom which easily coordinates with magnesium, a water molecule is further attached to a hydrogen atom of a water molecule, resulting in deliquescence of the whole film.

An example of a compound which produces magnesium fluoride by disproportional reaction is a compound composed of magnesium and trifluoroacetic acid. The hygroscopic state of magnesium trifluoroacetate is shown by the following structural formulae (A) to (C).

[Chem. 3]

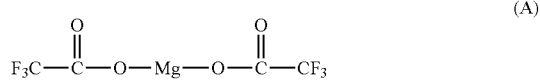

(A)

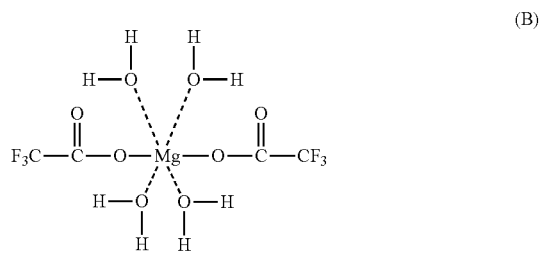

(B)

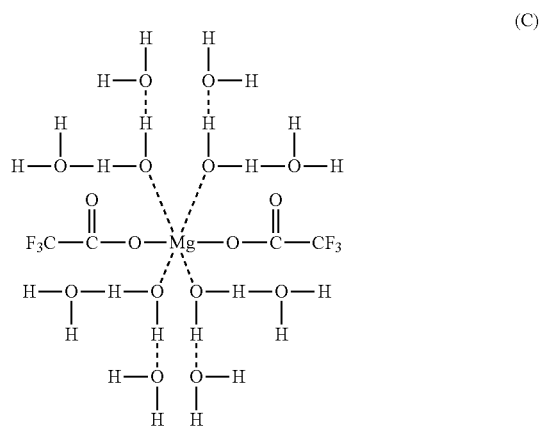

(C)

The structural formula (A) shows an initial state or a state in which water is not coordinated. On the other hand, a state where crystal water or water is coordinated is shown by the structural formula (B). An estimated state where atmospheric water is further adsorbed is shown by the structural formula (C).

When a non-aqueous compound, instead of water, is previously coordinated to magnesium, a state represented by a structural formula below is created, thereby possibly eliminating the influence by atmospheric moisture.

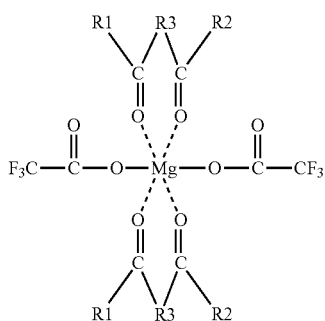

[Chem. 4]

In use of acetic anhydride as the non-aqueous compound, magnesium is stabilized in a form represented by a structural formula below, and the occurrence of defects in a coating film due to moisture absorption can be prevented by preventing moisture adsorption.

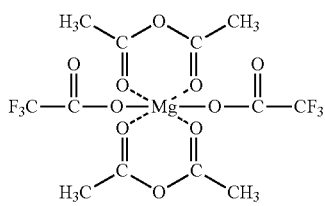

[Chem. 5]

In the present invention, an optical film composed of magnesium fluoride is formed by applying the coating solution for producing an optical film, the coating solution containing the magnesium compound as a magnesium fluoride precursor, to a substrate and inducing disproportional reaction by a method of firing or the like, and producing an optical member is manufactured using the optical film. In this case, in the coating film-forming step, the influence of water absorption from an atmosphere can be eliminated by adding, as a non-aqueous stabilizer, a compound represented by the general formula (1) to the magnesium fluoride precursor, thereby suppressing the occurrence of defects in the coating film. In addition, the temporal stability of the coating material is improved, and thus the refractive index of the resultant optical film is stable over a long period of time, thereby permitting stable use of the resultant coating material over a long period of time.

In the present invention, a glass or plastic substrate can be used as the substrate. Typical examples of the plastic substrate include films and moldings of thermoplastic resins such as polyester, triacetylcellulose, cellulose acetate, polyethylene terephthalate, polypropylene, polystyrene, polycarbonate, polymethyl methacrylate, ABS resins, polyphenylene oxide, polyurethane, polyethylene, polyvinyl chloride, and the like; crosslinked films and crosslinked moldings produced from various thermosetting resins such as unsaturated polyester resins, phenol resins, crosslinked polyurethane, crosslinked acrylic resins, crosslinked saturated polyester resins, and the like.

The coating solution for producing an optical film of the present invention contains the magnesium compound represented by $(CF_2—X—COO)_2Mg$ as a compound containing a $CF_3$ group, which functions as a fluorine source by disproportional reaction, and the compound represented by the general formula (1) below.

The magnesium compound is represented by $(CF_2—X—COO)_2Mg$ wherein X represents a single bond or $—CH_2—$ which may be substituted by a fluorine atom. For example, a single bond or $—CH_2—$ is preferred. The magnesium compound which can be used is produced by mixing a magnesium compound, such as magnesium acetate or acetylacetone magnesium, and a fluorocarboxylic acid in a solvent or by reacting metallic magnesium with a fluorocarboxylic acid.

The compound represented by the general formula (1) is used as a stabilizer and represented by the following structural formula.

[Chem. 6]

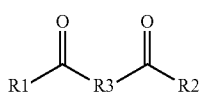

General Formula (1)

In this formula, R1 and R2 each represent a hydrogen atom, an alkyl group, or an alkoxy group, and R3 represents $—O—$ or $—CH_2—$. An alkyl group or alkoxy group is an alkyl group having 1 to 3 carbon atoms.

Examples of the compound represented by the general formula (1) include β-diketone compounds such as acetylacetone (AcAc), dipivaloyl methane, trifluoroacetylacetone, hexafluoroacetylacetone, benzoylacetone, dibenzoylmethane, and the like; β-ketoester compounds such as methyl acetoacetate, ethyl acetoacetate (EAcAc), allyl acetoacetate, benzyl acetoacetate, iso-propyl acetoacetate, tert-butyl acetoacetate, iso-butyl acetoacetate, 2-methoxyethyl acetoacetate, methyl 3-keto-n-valerate, and the like; and acetic anhydride $(Ac_2O)$.

With respect to the contents of the magnesium compound and the compound represented by the general formula (1) which are contained in the coating solution for producing an optical film of the present invention, the content of the compound represented by the general formula (1) is 0.1 mol or more and 5 mol or less, preferably 0.5 mol or more and 2 mol or less, relative to 1 mol of the magnesium compound. At a content of less than 0.1 mol, the film defect preventing effect is not sufficient, while at a content over 5 mol, the coating material is stabilized, but the refractive index of the resultant film is increased.

A method for producing a coating solution for producing an optical film of the present invention includes a step of mixing a magnesium compound and a compound represented by the general formula (1) and then adjusting the concentration of the resultant mixture with a solvent. The coating solution for producing an optical film is produced by dissolving the magnesium compound and the compound represented by the general formula (1) in a solvent.

In producing the coating solution, in order to stabilize the magnesium compound, it is important to dilute with a solvent after mixing the magnesium compound and the compound represented by the general formula (1). When the compound represented by the general formula (1) is added after the magnesium compound is dissolved in the solvent, the compound represented by the general formula (1) does not effectively function, and the pinhole preventing effect on the coating film cannot be sufficiently obtained or the amount of the compound represented by the general formula (1) added is required to be increased.

An organic solvent can be used as the solvent. Examples of the organic solvent include alcohols such as methanol, ethanol, 2-propanol, butanol, ethylene glycol, ethylene glycol mono-n-propyl ether, and the like; various aliphatic or alicyclic hydrocarbons such as n-hexane, n-octane, cyclohexane, cyclopentane, cyclooctane, and the like; various aromatic hydrocarbons such as toluene, xylene, ethylbenzene, and the like; various esters such as ethyl formate, ethyl acetate, n-butyl acetate, ethylene glycol monomethyl ether acetate, ethylene glycol monoethyl ether acetate, ethylene glycol monobutyl ether acetate, and the like; various ketones such as acetone, methyl ethyl ketone, methyl isobutyl ketone, cyclohexanone, and the like; various ethers such as dimethoxyethane, tetrahydrofuran, dioxane, diisopropyl ether, and the like; various chlorinated hydrocarbons such as chloroform, methylene chloride, carbon tetrachloride, tetrachloroethane, and the like; aprotic solvents such as N-methylpyrrolidone, dimethylformamide, dimethylacetamide, ethylenecarbonate, and the like. In preparing the coating solution used in the present invention, alcohols among the above-described various solvents can be used from the viewpoint of stability of the solution.

The content of each of the magnesium compound and the compound represented by the general formula (1) which are contained in the coating solution is 1% by weight or more and 40% by weight or less and preferably 5% by weight or more and 20% by weight or less.

A method for manufacturing an optical component of the present invention includes a step of applying the coating solution for producing an optical film to a substrate, and a step of heating the substrate to which the coating solution for producing an optical film has been applied.

The coating solution prepared as described above is applied to an optical element to form a film. As the method for forming a coating film, an existing coating method, for example, a dipping method, a spin coating method, a spray method, a printing method, a flow coating method, or a combination of two or more of these methods, can be appropriately used. The thickness can be controlled by changing the pulling-up rate in the dipping method or the substrate rotational speed in the spin coating method, and changing the concentration of the coating solution.

The solvent is appropriately selected according to the coating method used. At an excessively high evaporation rate, nonuniform coating easily occurs. This can be improved by using a solvent with low vapor pressure.

The thickness of the coating film is decreased to about ½ to 1/10 by thermal and/or electromagnetic disproportional reaction. The degree of decrease varies with the conditions of the disproportional reaction.

In any case, the thickness of the coating film is controlled so that the thickness d after thermal disproportional reaction is an integral multiple of optical thickness $\lambda/4$ at design wavelength $\lambda$.

The temperature of thermal disproportional reaction depends on the fluorine-containing organic magnesium compound used.

In use of magnesium trifluoroacetate, thermal disproportional reaction is caused by heating at 250° C. In this case, when the atmosphere contains a fluorine compound, fluorination is promoted, and a film is further made porous, thereby decreasing the refractive index. The action of making the film porous proceeds by heating, and thus the heating time is preferably 10 minutes to 2 hours, more preferably 30 minutes to 1 hour.

In order to increase the amount of the fluorine compound in the atmosphere in the disproportional reaction step, it is also effective to further add the fluorine compound to the coating solution.

Assuming that a fluorine-containing precursor of metal M is (M-X—F), the disproportional reaction is simply represented by the following formula:

In this case, (A) a fluorine atom is separated by heating, (B) a M-X bond is cut by the fluorine atom, and (C) the reaction of producing M-F proceeds.

However, the reaction (B) does not necessarily take place because of the high reactivity of a fluorine atom, and the fluorine atom produced in (A) may be scattered to the outside of the reaction system, thereby failing to induce the expected reaction (C). This suggests that in the disproportional reaction, fluorination does not necessarily proceed according to the above formula.

Therefore, fluorination by the disproportional reaction can be efficiently produced by avoiding scattering of the fluorine atoms produced in (A).

An effective method for avoiding scattering of the fluorine atoms is to provide a shield or introduce another fluorine source for promoting the reaction. Also, the substrate can be used as the shield according to the shape of the substrate. For example, in the case of a shape such as a concave lens, the same effect as described above can be achieved by disposing a concave surface facing downward.

It is considered that a functional group (e.g., —O— or —OH) other than fluorine is present in a portion other than M-F, i.e., a portion which is stoichiometrically not fluorinated.

It is also considered that the environmental characteristics are worsened by the presence of such a portion other than fluorine. Therefore, when a silicon oxide binder having good affinity for the portion other than fluorine and further having reactivity is applied to the produced fluoride and is cured, an optical component including a low-refractive-index optical film with excellent strength, which is formed on a substrate, is manufactured.

As a silicon oxide precursor, various silicon alkoxides, silazane, and polymers thereof can be used. Among these, polysilazane is can be used because it is rich in reactivity.

Examples of the silicon alkoxides include those each having the same or different lower alkyl groups such as an ethyl group, a propyl group, an isopropyl group, a butyl group, an isobutyl group, and the like.

Examples of the polysilazane include polysilazane (perhydropolysilazane) containing substantially no organic group, polysilazane in which an alkyl group, an alkenyl group, an aryl group, a cycloalkyl group, or such a group substituted by a substituent for part or all of the hydrogen atoms bonded to a carbon atom is bonded to a silicon atom, polysilazane in which a hydrolyzable group such as an alkoxy group is bonded to a silicon atom, polysilazane in which an organic group such as an alkyl group is bonded to a nitrogen atom, and the like.

A silicon oxide precursor can promote a curing reaction by using a catalyst. An acid or basic catalyst can be used for silicon alkoxides. An amine compound or a metal catalyst or a compound thereof can be used as the catalyst for silazane.

A solution of the silicon oxide precursor is diluted with a solvent and applied to the porous magnesium fluoride. In the case of silazane or a polymer thereof, it is important to use a hydrophobic solvent because of the high reactivity. Examples of the hydrophobic solvent include petroleum solvents such as xylene, toluene, and the like, dibutyl ether, and the like.

In the case of silazane, it is important to suppress reaction by adding the catalyst at the time of or after dilution with the hydrophobic solvent.

The solution containing the silicon oxide precursor applied to the fluoride preferably falls in the range of $0.001 \leq SiO_2 \leq 0.1$, more preferably $0.005 \leq SiO_2 \leq 0.05$, in terms of silica. When $SiO_2 < 0.001$, the amount of the precursor serving as a binder is not sufficient, and thus the strength of the resultant film becomes insufficient, while when $SiO_2 > 0.1$, the strength is increased, but the refractive index is increased.

The content "in terms of silica" represents the solid content after complete reaction of the solution containing the silicon oxide precursor. The complete reaction of the solution containing the silicon oxide precursor at 10% by mass in terms of silica can produce a fired product composed of 10% by mass of silica ($SiO_2$). However, this does not apply to the case where the precursor is not completely converted to $SiO_2$ due to organic modification or the like.

The silicon oxide precursor is cured by heating. The silazane having higher reactivity than alkoxides may be converted to silica at room temperature. More compact silica can be formed by applying moisture and heat.

The optical component according to the present invention may be further provided with a layer for imparting any one of various functions. For example, an adhesive layer or a primer layer can be provided for improving adhesion between a transparent substrate and a hard coat layer. The other layer provided between the transparent substrate and the hard coat layer as described above has a refractive index which is an intermediate value between the refractive indexes of the transparent substrate and the hard coat layer.

When such a low-refractive-index film is used singly or in combination with a multilayer film in the optical component, excellent anti-reflection performance can be realized. In addition, when the low-refractive-index film is used as the uppermost layer in a multilayer structure, the low refractive index leads to a decrease in interface reflection and improvement in oblique-incidence characteristics.

Figure 1B:
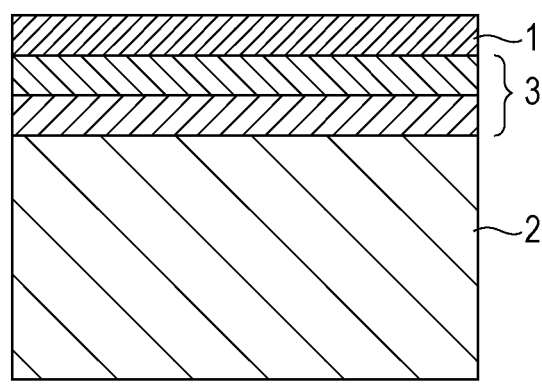
FIG. 1B is a drawing showing an example of an optical component according to the present invention.

The optical component according to the present invention can be applied to various optical components. FIGS. 1A and 1B each show an example of an optical component manufactured by the method for manufacturing an optical component according to the present invention. FIG. 1A shows an example in which reference numeral 1 denotes a substrate, and reference numeral 2 denotes an optical film formed from the coating solution of the present invention. FIG. 1B shows an example in which reference numeral 1 denotes a substrate, reference numeral 2 denotes an optical film formed from the coating solution of the present invention, and reference numeral 3 denotes a multilayer film formed between the substrate and the optical film. Although FIG. 1B shows a two-layer film as an example, a single layer film or a multilayer film may be provided, the multilayer film including a high-refractive-index film and a low-refractive-index film provided in alternate layers. Examples of the film formed between the substrate and the optical film include films of inorganic compounds such as titanium oxide ($TiO_2$), silicon oxide ($SiO_2$), and magnesium fluoride ($MgF_2$), films of organic materials such as various resins, organic-inorganic composite films produced from metal alkoxides as starting materials, and the like. Since a low-refractive-index film can be realized from the optical film produced from the coating solution of the present invention, an optical member according to the present invention has excellent anti-reflection performance. Also, even when stain adheres to the optical film, the stain can be wiped off because of the excellent strength, and thus the optical film can be formed on the outermost surface. The optical member according to the present invention can be applied to various optical components.

Other Embodiments

The optical component manufactured by the method for manufacturing an optical component according to the present invention can be used for imaging optical systems such as imaging lenses of a camera, and the like.

The optical member according to the present invention is used as at least one optical member of an imaging optical system so that light from an object is condensed by the optical member to form an object image on an imaging element. The optical film produced from the coating solution of the present invention is used as at least one of the optical films formed in the optical member. The optical film produced from the coating solution of the present invention has a low refractive index and thus has excellent anti-reflection performance and excellent strength, and thus can be formed on the outermost surface.

The optical component of the present invention can also be used for a binocular, display devices such as a projector, window glass, etc.

EXAMPLES

The present invention is described in detail below with reference to examples.

Example 1

A soda lime glass substrate having a diameter of 30 mm and a thickness of 1 mm was ultrasonically washed and dried to prepare a glass substrate for coating.

Trifluoroacetic acid was slowly added to 1 part by mass of magnesium powder and 15 parts by mass of 1-butanol to dissolve metallic magnesium. After the magnesium was completely dissolved, the resultant solution was filtered with a 0.20 μm filter, followed by vacuum drying to prepare magnesium trifluoroacetate.

Then, 0.1 mol of acetylacetone (AcAc) was added as the compound (hereinafter referred to as a "stabilizer") represented by the general formula (1) to 1 mol of the magnesium trifluoroacetate, followed by heating dissolution. Then, 50 mol of isopropyl alcohol was added as a solvent to prepare a coating material.

The glass substrate was spin-coated with the coating solution, allowed to stand in a room (23° C., 50%) for 10 minutes, and then heated for 1 hour on a hot plate set to 300° C. to induce disproportional reaction.

Defects occurring in the resultant film were examined and evaluated as follows:
A: 0, B: 1 to 4 defects, C: 5 or more defects
The results are shown in Table 1.

Ten days after, a sample was formed using the coating solution by the same method as described above, and the refractive index of the resultant optical film was measured to evaluate variation in characteristics from the initial state of preparation. A variation in refractive index between the sample in the initial state (0 day) and the sample formed 10 days after the preparation of the coating material was evaluated as follows:
A: less than ±0.01
B: ±0.01 or more
Measurement of Film Defects The number of defects occurring in a film surface was measured by visual observation.

Measurement of Refractive Index

The refractive index and film thickness were analyzed by ellipsometry within the wavelength range of 190 nm to 1000 nm using a spectroscopic ellipsometer (J. A. Woolam Japan Co., Ltd., M-2000D).

Examples 2 to 6

Preparation and evaluation were performed by the same method as in Example 1 except that in Example 1, the amount of acetylacetone (AcAc) serving as the stabilizer was changed to 0.2, 0.5, 1, 2, and 5 mol, respectively.

Examples 7 to 12

Preparation and evaluation were performed by the same method as in Examples 1 to 6 except that the stabilizer was changed to ethyl acetoacetate (EAcAc).

Examples 13 to 18

Preparation and evaluation were performed by the same method as in Examples 1 to 6 except that the stabilizer was changed to acetic anhydride ($Ac_2O$).

Example 19

Preparation and evaluation were performed by the same method as in Example 4 except that trifluoroacetic acid was changed to pentafluoropropionic acid ($CF_3CF_2COOH$, manufactured by Tokyo Chemical Industry Co., Ltd.) to prepare a magnesium fluoride precursor.

Examples 20 and 21

Preparation and evaluation were performed by the same method as in Example 4 except that the stabilizer was changed to ethyl acetoacetate (EAcAc) and acetic anhydride ($Ac_2O$), respectively.

Comparative Example 1

Preparation and evaluation were performed by the same method as in Example 1 except that acetylacetone (AcAc) was not added as the stabilizer.

Comparative Examples 2 and 3

Preparation and evaluation were performed by the same method as in Example 1 except that the amount of acetylacetone (AcAc) serving as the stabilizer was changed to 0.05 mol and 10 mol, respectively.

Comparative Example 4

Preparation and evaluation were performed by the same method as in Example 19 except that acetylacetone (AcAc) was not added as the stabilizer.

Comparative Example 5

Preparation and evaluation were performed by the same method as in Example 1 except that 10 parts by mass of trifluoroacetic acid was slowly added to 1 part by mass of magnesium acetate tetrahydrate (manufactured by Kishida Chemical Co., Ltd.) and 15 parts by mass of isopropyl alcohol to prepare a coating material.

Comparative Example 6

Preparation and evaluation were performed by the same method as in Example 1 except that 10 parts by mass of trifluoroacetic acid was slowly added to 1 part by mass of magnesium ethoxide (manufactured by Aldrich Corporation) and 15 parts by mass of isopropyl alcohol to prepare a coating material.

The results of the examples of the comparative examples are shown in Table 1 below.

TABLE 1

| | Magnesium compound | Stabilizer | Adding amount (mol) | Film defects | Variation in refractive index |
|---|---|---|---|---|---|
| Example 1 | $Mg + CF_3COOH \rightarrow Mg(CF_3COO)_2$ | AcAc | 0.1 | A | A |
| Example 2 | $Mg + CF_3COOH \rightarrow Mg(CF_3COO)_2$ | AcAc | 0.2 | A | A |
| Example 3 | $Mg + CF_3COOH \rightarrow Mg(CF_3COO)_2$ | AcAc | 0.5 | A | A |
| Example 4 | $Mg + CF_3COOH \rightarrow Mg(CF_3COO)_2$ | AcAc | 1 | A | A |
| Example 5 | $Mg + CF_3COOH \rightarrow Mg(CF_3COO)_2$ | AcAc | 2 | A | A |
| Example 6 | $Mg + CF_3COOH \rightarrow Mg(CF_3COO)_2$ | AcAc | 5 | A | A |
| Example 7 | $Mg + CF_3COOH \rightarrow Mg(CF_3COO)_2$ | EAcAc | 0.1 | A | A |
| Example 8 | $Mg + CF_3COOH \rightarrow Mg(CF_3COO)_2$ | EAcAc | 0.2 | A | A |
| Example 9 | $Mg + CF_3COOH \rightarrow Mg(CF_3COO)_2$ | EAcAc | 0.5 | A | A |
| Example 10 | $Mg + CF_3COOH \rightarrow Mg(CF_3COO)_2$ | EAcAc | 1 | A | A |
| Example 11 | $Mg + CF_3COOH \rightarrow Mg(CF_3COO)_2$ | EAcAc | 2 | A | A |
| Example 12 | $Mg + CF_3COOH \rightarrow Mg(CF_3COO)_2$ | EAcAc | 5 | A | A |
| Example 13 | $Mg + CF_3COOH \rightarrow Mg(CF_3COO)_2$ | AcOAc | 0.1 | A | A |
| Example 14 | $Mg + CF_3COOH \rightarrow Mg(CF_3COO)_2$ | AcOAc | 0.2 | A | A |
| Example 15 | $Mg + CF_3COOH \rightarrow Mg(CF_3COO)_2$ | AcOAc | 0.5 | A | A |
| Example 16 | $Mg + CF_3COOH \rightarrow Mg(CF_3COO)_2$ | AcOAc | 1 | A | A |
| Example 17 | $Mg + CF_3COOH \rightarrow Mg(CF_3COO)_2$ | AcOAc | 2 | A | A |
| Example 18 | $Mg + CF_3COOH \rightarrow Mg(CF_3COO)_2$ | AcOAc | 5 | A | A |
| Example 19 | $Mg + CF_3CF_2COOH \rightarrow Mg(CF_3CF_2COO)_2$ | AcAc | 1 | A | A |
| Example 20 | $Mg + CF_3CF_2COOH \rightarrow Mg(CF_3CF_2COO)_2$ | EAcAc | 1 | A | A |
| Example 21 | $Mg + CF_3CF_2COOH \rightarrow Mg(CF_3CF_2COO)_2$ | AcOAc | 1 | A | A |
| Comparative Example 1 | $Mg + CF_3COOH \rightarrow Mg(CF_3COO)_2$ | No | No | B | B |
| Comparative Example 2 | $Mg + CF_3COOH \rightarrow Mg(CF_3COO)_2$ | AcAc | 0.05 | B | B |

TABLE 1-continued

| | Magnesium compound | Stabilizer | Adding amount (mol) | Film defects | Variation in refractive index |
|---|---|---|---|---|---|
| Comparative Example 3 | Mg + $CF_3COOH \rightarrow Mg(CF_3COO)_2$ | AcAc | 10 | A | B |
| Comparative Example 4 | Mg + $CF_3CF_2COOH \rightarrow Mg(CF_3CF_2COO)_2$ | No | No | B | B |
| Comparative Example 5 | $Mg(CH_3COOH)_2 \cdot 4H_2O + CF_3COOH \rightarrow Mg(CF_3COO)_2 \cdot 4H_2O + CH_3COOH$ | No | No | C | B |
| Comparative Example 6 | $(C_2H_5)_2Mg \cdot 2H_2O + CF_3COOH \rightarrow Mg(CF_3COO)_2 \cdot 2H_2O + C_2H_5OH$ | NO | No | C | B |

(Note 1)
The adding amount indicates the mol number of the stabilizer per mol of the magnesium compound.

According to the present invention, an optical film having a low refractive index can be formed using thermal disproportional reaction, and thus can be used for optical films of optical components having anti-reflection performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-220571, filed Sep. 30, 2010, which is hereby incorporated by reference herein in its entirety.

The invention claimed is:

1. A method for producing a coating solution for producing an optical film comprising:

mixing a dried magnesium compound represented by $(CF_3-X-COO)_2Mg$ (wherein X represents a single bond, $-CH_2-$ or $-CF_2-$) and a compound represented by the general formula (1) below, thereby coordinating the compound represented by the general formula (1) below to Mg of the magnesium compound represented by $(CF_3-X-COO)_2Mg$, and adding a solvent to the resultant mixture;

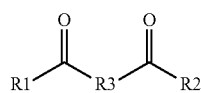

General Formula (1)

wherein R1 and R2 each represent a hydrogen atom, an alkyl group, or an alkoxy group, and R3 represents $-O-$ or $-CH_2-$.

2. A method for manufacturing an optical component comprising:

a step of applying the coating solution produced according to claim 1 to a substrate; and a step of heating the substrate to which the coating solution for producing an optical film is applied.

3. An imaging optical system comprising an optical component manufactured by the method for manufacturing an optical component according to claim 2, wherein light from an object is condensed by the optical component to form an object image.

4. The method for producing a coating solution according to claim 1, wherein an amount of the compound represented by the following general formula (1) is in a range of 0.1 mol or more and 5 mol or less per mol of the magnesium compound.

5. The method for producing a coating solution according to claim 1, wherein the dried magnesium compound is prepared by adding a fluorocarboxylic acid, a trifluoroacetic acid or a pentafluoropropionic acid to a magnesium powder.

6. The method for producing a coating solution according to claim 1, wherein the dried magnesium compound is prepared by mixing a magnesium compound with a fluorocarboxylic acid.

* * * * *